June 1, 1948.                    E. B. BAKER                    2,442,481
            PROCESS FOR THE PRODUCTION OF MAGNESIUM COMPOUNDS
                          Filed Aug. 26, 1944
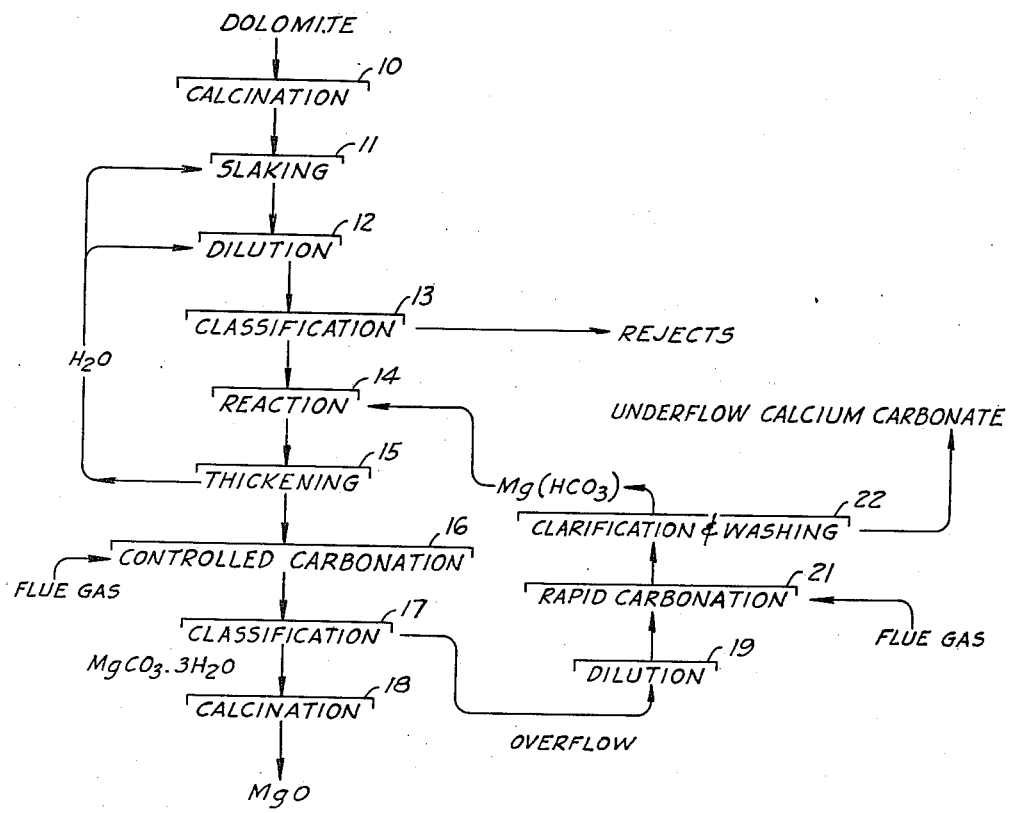
INVENTOR
EDGAR B. BAKER
BY
ATTORNEY Patented June 1, 1948

2,442,481

UNITED STATES PATENT OFFICE 2,442,481

PROCESS FOR THE PRODUCTION OF MAGNESIUM COMPOUNDS

Edgar B. Baker, Burlingame, Calif., assignor to Marine Magnesium Products Corporation, South San Francisco, Calif., a corporation of Delaware Application August 26, 1944, Serial No. 551,331

6 Claims. (Cl. 23—67)

This invention relates generally to processes for the production of magnesium compounds from certain magnesium containing materials, particularly minerals such as dolomite which have a substantial calcium content in addition to magnesium.

In co-pending application Serial No. 533,704, filed May 2, 1944, in the joint names of Gunter H. Gloss and Edgar B. Baker, there is disclosed a process applicable to dolomite and other magnesium containing materials for the purpose of recovering a desired magnesium compound from the same. A feature of that process is the use of a novel type of controlled carbonation of a slurry containing magnesium hydroxide, whereby neutral magnesium carbonate of large particle size is produced, as for example, a particle size of 200 microns or more. Such a neutral carbonate can be readily separated out from other solids of the slurry by known separating methods.

In certain of the embodiments disclosed in said application Serial No. 533,704, which are particularly applicable to dolomite, the neutral magnesium carbonate from a first stage of controlled carbonation is reacted with a caustic like sodium hydroxide to form a magnesium hydroxide slurry which is then subjected to a second stage of controlled carbonation. The caustic is reused or recycled in the process by recovering sodium carbonate from the magnesium hydroxide slurry, after the above mentioned reaction, and utilizing the same to react with dolomitic slurry being supplied to the first stage of controlled carbonation. In this reaction of sodium carbonate with the incoming dolomitic slurry calcium hydroxide is converted to calcium carbonate, thus forming sodium hydroxide which is then separated out and reused in the process.

The process described above, utilizing a caustic with two stages of controlled carbonation, is capable of producing a final magnesium compound having a fair degree of purity. However the recovery or yield is not as high as desired. Furthermore in many commercial installations the use of a caustic is objectionable.

It is an object of the present invention to provide a process for the manufacture of magnesium compounds from dolomite or dolomitic slurries, which will make use of controlled carbonation as described in said co-pending application Serial No. 533,704, and which will give a fair degree of purity without using two stages of controlled carbonation and without the use of caustic.

Another object of the invention is to provide a process of the above character which is capable of relatively high percentage recovery of magnesium (i e. in the form of MgO) from dolomitic materials.

Further objects of the invention will appear from the following description in which the preferred embodiment has been set forth in detail in conjunction with the accompanying drawing.

In general the present process makes use of magnesium containing material of the type having a substantial calcium content, as for example any one of many dolomites. The dolomite is treated by calcination and slaking to form a slurry containing calcium and magnesium hydroxides. Prior to carrying out controlled carbonation, the slurry is reacted with a magnesium bicarbonate solution whereby all or a substantial part of the calcium hydroxide is converted to calcium carbonate. Thereafter the slurry is subjected to controlled carbonation carried out in the manner described in the aforesaid co-pending application Serial No. 533,704, to produce neutral magnesium carbonate of relatively large particle size. The carbonated slurry is then subjected to some suitable separating treatment whereby the major part of the neutral magnesium carbonate is removed in an underflow, and remaining magnesium carbonate, together with calcium carbonate and other solids, are removed in an overflow. The magnesium carbonate content of the overflow is then converted by carbonation to magnesium bicarbonate to provide the magnesium bicarbonate for reaction with the incoming slurry. In this manner it is possible to obtain an underflow relatively free of calcium, and at the same time loss of magnesium in the overflow is prevented.

A more detailed procedure for carrying out the process is shown in the flow sheet of the accompanying drawing. In this instance a suitable dolomite is shown subjected to calcination 10, which is carried out under such conditions of temperature and time as to convert all of the calcium and magnesium carbonate of the dolomite to calcium and magnesium oxides. The calcined material is then slaked with water at 11, and after preliminary slaking it is diluted with water at 12 to form a slurry suitable for further treatment. Assuming that the slurry at this time has some solid impurities, such as silica, it is subjected to hydraulic classification 13 whereby rejects such as silica are removed in an overflow. At this point the ratio between the calcium and magnesium hydroxides in the purified slurry will be dependent upon the ratio between calcium and magnesium carbonates in the original dolomite. In a typical instance however the slurry may contain equi-molecular parts of calcium and magnesium hydroxides, and the solids content may be of the order of 12%.

In the succeeding step 14 the purified slurry is reacted with a magnesium bicarbonate solution whereby all or a substantial part of the calcium hydroxide is converted to solid phase calcium carbonate. For example with equi-molecular proportions of calcium and magnesium hydroxides in the slurry undergoing treatment, and since one mol of magnesium bicarbonate reacts with two moles of calcium hydroxide, a maximum of 0.5 equivalents of the calcium content of the slurry can be supplied to this reaction in the form of magnesium bicarbonate. Assuming that all of the calcium hydroxide is reacted with magnesium bicarbonate, the resulting slurry contains solid phase calcium carbonate together with magnesium hydroxide. It is desirable at this point to somewhat thicken the slurry at 15, to produce for example a slurry containing say about 8 to 10% solids. Water removed from this thickening operation can be reused in the slaking and diluting operations 11 and 12. The thickened slurry is then subjected to controlled carbonation 16 carried out in the manner described in the aforesaid co-pending application.

Assuming that controlled carbonation is carried out as a batch operation, one can use a simple tank which can be charged with the batch of the slurry, and which has a discharge pipe at its lower end. Another pipe should communicate with the upper part of the tank for introducing the slurry, and a pipe should communicate with the lower part of the tank for introducing a carbon dioxide containing gas, such as flue gas. Introduction of the flue gas generally causes sufficient agitation of the material, or if the gas is relatively concentrated with respect to its carbon dioxide content, slow mechanical agitation can be employed.

To carry out a controlled carbonating operation an initial batch of the slurry is introduced into this tank, and the batch then seeded with a small amount of previously produced neutral magnesium carbonate particles. Normal flue gas containing for example about 10 to 12% carbon dioxide is introduced into the mass of material at a relatively slow rate, and such introduction continued until all of the magnesium hydroxide of the batch has been converted to solid phase neutral magnesium carbonate. At this point introduction of further slurry into the top of the tank is commenced and is maintained continuously in balance with the incoming flow of flue gas. This balance is such that the concentration of the liquid phase (total $CO_3$ and $HCO_3$ ions) is kept within the limits of about 0.02 to 0.05 mol per liter. When controlled in this manner the bicarbonate concentrate may fall within the limits of about 0.01 to 0.015 mol per liter. In general the control is such that the rate of conversion of magnesium hydroxide into solid phase neutral carbonate is not in excess of 0.12 mol per gallon per hour, and preferably somewhat slower. Carbonation is continued under such conditions until the carbonating tank is filled, at which time the charge is drained off from the bottom of the tank.

When one desires to carry out such controlled carbonation continuously, instead of draining off all the charge from the bottom of the tank a slurry is bled off continuously with continuance of introduction of flue gas and incoming slurry at controlled rates, as previously described.

The carbonating equipment for such controlled carbonation should be designed and operated whereby it provides a retention period of about 36 to 48 hours for the feed slurry. The entire carbonating operation is carried out under normal atmospheric temperatures, ranging for example from 10 to 30° C. The bulk of the neutral magnesium carbonate particles formed by controlled carbonation as described above will have a particle size ranging from say 200 to 400 microns, or even larger. This is in contrast to a particle size of say 10 to 40 microns obtained by ordinary rapid carbonation. Such large size particles can be readily separated out by various known methods of hydraulic classification, such as centrifuging.

In the flow sheet the material after controlled carbonation, which now consists of neutral magnesium carbonate together with calcium carbonate, is subjected to classification 17 which can be carried out by the use of a suitable type of continuous centrifuge, such as one of the "Bird" type. Preferably the centrifuge or other equipment used for this classification is adjusted to produce an underflow containing the bulk of the neutral magnesium carbonate, and an overflow containing calcium carbonate together with remaining neutral magnesium carbonate. For example in the example previously stated, about one-third of the neutral magnesium carbonate drawn off from the controlled carbonation operation is withdrawn in the overflow, with the remaining two-thirds passing out in the underflow. Various magnesium compounds can be made from this underflow, and as indicated it can be calcined at 18 to form magnesium oxide, or it can be converted by heat treatment to form basic carbonate.

The overflow from the classification operation 17, which has a substantial magnesium carbonate content as previously explained, is treated to provide magnesium bicarbonate for the reaction 14. Thus it is diluted with water at 19 to form a slurry containing for example 4% solids. This diluted slurry is then subjected to carbonation 21 which can be carried out at a rapid rate by contact of the slurry with kiln flue gas. The kiln flue gas for this purpose may contain say 25 to 30% carbon dioxide. As a result of such carbonation the neutral magnesium carbonate is converted to dissolved magnesium bicarbonate. The material is then subjected to a clarifying operation 22, from which is withdrawn an underflow containing the solid phase calcium carbonate. This solid phase material can be washed to more effectively remove magnesium bicarbonate from the same. The resulting magnesium bicarbonate solution, free of the solid phase calcium carbonate, is now used in the reaction 14.

It will be evident from the foregoing that relatively high recovery can be obtained with the present process. For example it is possible to secure recoveries of the order of 90% or better, in contrast with recoveries of 75 to 80% obtainable from two stage controlled carbonation with caustic treatment, as previously described. Magnesium oxides can be obtained with a purity of 95%. This is sufficient purity for many commercial purposes, as for example for refractories, insulation, etc.

I claim:

1. In a process for the recovery of a magnesium compound from a hydrous slurry containing both calcium and magnesium hydroxides, the steps of reacting the slurry with magnesium bicarbonate so as to convert at least a substantial part of the calcium hydroxide to calcium carbonate, subjecting the resulting slurry to carbonation so as to produce solid phase carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of a particle size greater than about 200 microns, subjecting the carbonated slurry to separating treatment whereby the bulk of the neutral magnesium carbonate is removed in an underflow and the calcium carbonate with the remainder of the neutral magnesium carbonate is removed in an overflow, converting neutral magnesium carbonate obtained from the overflow to magnesium bicarbonate, and utilizing such magnesium bicarbonate in said first named reaction.

2. In a process for the recovery of a magnesium compound from a hydrous slurry containing both calcium and magnesium hydroxides, the steps of reacting the slurry with magnesium bicarbonate so as to effect conversion of at least a substantial part of the calcium hydroxide to calcium carbonate, subjecting the resulting slurry to carbonation so as to produce solid phase carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of a particle size greater than about 200 microns, subjecting the carbonated slurry to separating treatment whereby the bulk of the neutral magnesium carbonate is removed in an underflow and whereby the calcium carbonate with the remainder of the neutral magnesium carbonate is removed in an overflow, subjecting the overflow to carbonation to convert the neutral magnesium carbonate to magnesium bicarbonate, subjecting the remaining material to separating treatment whereby the magnesium bicarbonate solution is separated from the calcium carbonate, and then utilizing such magnesium bicarbonate solution for carrying out the first named reaction.

3. In a process for the recovery of a magnesium compound from dolomite, subjecting the material to calcination whereby both the calcium and magnesium contents are converted to calcium and magnesium oxides, slaking the material with water to form a slurry containing calcium and magnesium hydroxides, reacting the slurry with magnesium bicarbonate so that at least the major part of the calcium hydroxide is converted to calcium carbonate, subjecting the resulting slurry to carbonation so as to produce solid phase carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of large particle size greater than about 200 microns, subjecting the resulting material to separating treatment whereby the bulk of the magnesium carbonate is removed in an underflow and the calcium carbonate together with the remaining portion of the neutral magnesium carbonate is removed in an overflow, subjecting the overflow to further carbonation whereby the neutral magnesium carbonate is converted to magnesium bicarbonate, removing the solid phase calcium carbonate from the magnesium bicarbonate solution, and then utilizing the magnesium bicarbonate solution for said first named reaction.

4. In a process for the recovery of a magnesium compound from a hydrous dolomitic slurry containing both calcium and magnesium hydroxides, the steps of reacting the slurry with a magnesium bicarbonate solution so as to convert at least the major part of the calcium hydroxide to calcium carbonate, subjecting the resulting slurry to carbonation so as to produce solid phase carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of a particle size greater than about 200 microns, subjecting the resulting slurry to separating treatment whereby the bulk of the neutral magnesium carbonate is removed in an underflow and whereby the calcium carbonate together with the remaining neutral magnesium carbonate is removed in an overflow, subjecting the overflow to rapid carbonation so as to convert the neutral magnesium carbonate to magnesium bicarbonate, and utilizing such magnesium bicarbonate in said first named reaction, the magnesium bicarbonate introduced in said first named reaction being not in excess of the amount required to react with all of the calcium hydroxide present.

5. In a process for the recovery of a magnesium compound from a hydrous dolomitic slurry containing both calcium and magnesium hydroxides, the steps of reacting the slurry with a magnesium bicarbonate solution so as to convert substantially all of the calcium hydroxide to calcium carbonate, subjecting the resulting slurry to carbonation so as to produce solid phase carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of a particle size greater than about 200 microns, subjecting the carbonated slurry to separating treatment whereby the bulk of the neutral magnesium carbonate is removed in an underflow and whereby the calcium carbonate together with the remaining neutral magnesium carbonate is removed in an overflow, the magnesium content of the overflow consisting substantially entirely of neutral magnesium carbonate, subjecting the overflow to carbonation so as to convert the neutral magnesium carbonate to magnesium bicarbonate and utilizing substantially all such magnesium bicarbonate as the solution used in said first named reaction.

6. In a process for the recovery of a magnesium compound from a hydrous dolomitic slurry containing both calcium and magnesium hydroxides, the steps of reacting the slurry with a magnesium bicarbonate solution so as to convert substantially all of the calcium hydroxide to calcium carbonate, subjecting the resulting slurry to carbonation so as to produce solid phase neutral magnesium carbonate, the rate of conversion of the magnesium hydroxide into solid phase carbonate being less than about 0.12 mol per gallon per hour and the concentration of carbon dioxide and carbonic acid in the liquid phase maintained within the limits of about 0.02 to 0.05 mol per liter to produce neutral magnesium carbonate of a particle size greater than about 200 microns, subjecting the carbonated slurry to separating treatment whereby calcium carbonate is removed in an overflow together with substantially one-third of the neutral magnesium carbonate and whereby the remaining bulk of the neutral magnesium carbonate is drawn off in an underflow, subjecting said overflow to carbonation so as to convert the neutral magnesium carbonate of the same to magnesium bicarbonate, separating such a magnesium bicarbonate solution from the solid phase material present, and utilizing substantially all such magnesium bicarbonate solution as the solution used in said first named reaction.

EDGAR B. BAKER.

REFERENCES CITED

The following references are of record in the file of this patent:

UNITED STATES PATENTS

| Number | Name | Date |
| --- | --- | --- |
| 2,338,886 | Vieweg et al. | Jan. 11, 1944 |
| 2,358,818 | Miller | Sept. 26, 1944 |
| 2,373,528 | Atchison | Apr. 10, 1945 |